(12) United States Patent
Fu et al.

(10) Patent No.: US 11,774,564 B2
(45) Date of Patent: Oct. 3, 2023

(54) LOW-COST READOUT MODULE FOR A LIDAR SYSTEM

(71) Applicant: Aptiv Technologies Limited, St. Michael (BB)

(72) Inventors: Geng Fu, Belmont, MA (US); Chenghui Hao, Cambridge, MA (US)

(73) Assignee: Aptiv Technologies Limited, St. Michael (BB)

( * ) Notice: Subject to any disclaimer, the term of this patent is extended or adjusted under 35 U.S.C. 154(b) by 907 days.

(21) Appl. No.: 16/784,062

(22) Filed: Feb. 6, 2020

(65) Prior Publication Data

US 2021/0247501 A1 Aug. 12, 2021

(51) Int. Cl.
G01S 7/48 (2006.01)
G01S 7/4865 (2020.01)
G01S 17/931 (2020.01)
G01S 7/4861 (2020.01)
G01S 17/10 (2020.01)

(52) U.S. Cl.
CPC .......... *G01S 7/4865* (2013.01); *G01S 7/4861* (2013.01); *G01S 17/10* (2013.01); *G01S 17/931* (2020.01)

(58) Field of Classification Search
None
See application file for complete search history.

(56) References Cited

U.S. PATENT DOCUMENTS

2012/0287417 A1* 11/2012 Mimeault ............... G01S 17/14
356/5.01
2017/0090019 A1 3/2017 Slobodyanyuk et al.
2017/0242109 A1 8/2017 Dussan et al.
2018/0081031 A1 3/2018 Yuan
2018/0284279 A1 10/2018 Campbell et al.

FOREIGN PATENT DOCUMENTS

WO  WO-0077540 A1 * 12/2000  ........... G01S 7/4802

OTHER PUBLICATIONS

"Extended European Search Report", EP Application No. 21152122.4, dated May 25, 2021, 8 pages.
"Characterization Measurement Results of MuTRiG—A Silicon Photomultiplier Readout ASIC with High Timing Precision and High Event Rate Capability", 2018.

* cited by examiner

*Primary Examiner* — Hovhannes Baghdasaryan
(74) *Attorney, Agent, or Firm* — Sawtooth Patent Group PLLC (57) ABSTRACT

Techniques and apparatuses are described that implement a low-cost readout module for a lidar system. The low-cost readout module includes a timing readout path and an intensity readout path, which are coupled to a receive channel of the lidar system. The timing readout path generates time-sensitive information using a threshold-triggered timing circuit, which can include a time-to-digital converter. The intensity readout path generates non-time-sensitive information using a hold-and-sample circuit, which can include a hold circuit and an analog-to-digital converter. By utilizing the threshold-triggered timing circuit to provide time-sensitive data and the hold-and-sample circuit to provide non-time-sensitive information, the readout module can have a lower cost than other readout modules that utilize a high-performance analog-to-digital converter for each receive channel.

20 Claims, 8 Drawing Sheets

LOW-COST READOUT MODULE FOR A LIDAR SYSTEM

BACKGROUND

Automotive lidar systems determine speed and distance of stationary and moving objects (e.g., other vehicles, pedestrians, obstacles, other objects of interest). A lidar system emits signals having shorter wavelengths (e.g., one to ten micrometers) than a radar system and therefore has improved spatial resolution for detecting small objects.

For high frame-rate and long-range applications, it is desirable to increase the quantity of receive channels within a lidar system. In particular, a larger quantity of receive channels can improve the angular resolution of the lidar system. Increasing the quantity of receive channels, however, can increase the cost and complexity of the lidar system's readout module, which generates digital information based on signals provided by the receive channels.

SUMMARY

Techniques and apparatuses are described that implement a low-cost readout module for a lidar system. In an example time-of-flight (ToF) lidar system, the low-cost readout module includes at least two readout paths, which are coupled to a receive channel of the lidar system. The two readout paths include a timing readout path and an intensity readout path. The timing readout path includes at least one threshold-triggered timing circuit, which generates time-sensitive information, such as timing data. The timing data can be used to detect an object and determine a distance to the object. In an example implementation, the threshold-triggered timing circuit includes a time-to-digital converter to identify a time associated with a rising edge of a pulse. The time-to-digital converter can be less expensive than an analog-to-digital converter. In some implementations, the timing readout path includes another threshold-triggered timing circuit to confirm that the time identified by the time-to-digital converter is associated with a pulse instead of noise.

The intensity readout path generates non-time-sensitive information, such as intensity data, which can be used to detect and/or classify the object. The intensity readout path includes a hold-and-sample circuit. In an example implementation, the hold-and-sample circuit includes a hold circuit and an analog-to-digital converter. By including the hold circuit, a low-performance analog-to-digital converter can sample an output of the hold circuit. The low-performance analog-to-digital converter can operate at a slower sampling rate and have a smaller bandwidth relative to other high-performance analog-to-digital converters that can provide both time-sensitive information and non-time-sensitive information. In some implementations, a low-performance analog-to-digital converter can be shared by multiple intensity readout paths to reduce size or complexity of the readout module. By utilizing a threshold-triggered timing circuit to provide time-sensitive data and a hold-and-sample circuit to provide non-time-sensitive information, the readout module can have a lower cost than other readout modules that utilize a high-performance analog-to-digital converter for each receive channel.

Aspects described below include an apparatus comprising a lidar system. The lidar system comprises a receiver and a readout module. The receiver comprises a receive channel. The readout module is coupled to the receiver and comprises a first node coupled to the receive channel, a second node, and a third node. The readout module also comprises a timing readout path and an intensity readout path. The timing readout path is coupled between the first node and the second node. The timing readout path comprises a time-to-digital converter. The intensity readout path is coupled between the first node and the third node. The intensity readout path comprises an analog-to-digital converter.

Aspects described below also include a method performed by a lidar system. The method includes receiving a lidar signal that is reflected by an object. The method also includes generating, using a receive channel of the lidar system, pulse data based on the lidar signal. Additionally, the method includes passing the pulse data to a timing readout path of the lidar system and an intensity readout path of the lidar system. Using the timing readout path, the method includes generating timing data that identifies a time associated with a rising edge of a pulse within the pulse data. Using the intensity readout path, the method includes generating intensity data that indicates an amount of energy associated with the pulse. The method further includes detecting the object based on the timing data and the intensity data.

Aspects described below also include a lidar system comprising reception means for generating pulse data based on a lidar signal that is reflected by an object. The lidar system also includes threshold-triggered means for generating timing data based on the pulse data. The timing data identifies times associated with rising edges of pulses within the pulse data. The lidar system additionally includes hold-and-sample means for generating intensity data by extending durations of the pulses within the pulse data and sampling the pulses. The intensity data indicates amounts of energy associated with the pulses. Both the threshold-triggered means and the hold-and-sample means are coupled to the reception means.

This summary is provided to introduce simplified concepts for implementing a low-cost readout module for a lidar system, which are further described below in the Detailed Description and Drawings. For ease of description, the disclosure focuses on automotive lidar systems; however, the techniques are not limited to automobiles. The techniques also apply to lidars of other types of vehicles, systems, and moving platforms. This summary is not intended to identify essential features of the claimed subject matter, nor is it intended for use in determining the scope of the claimed subject matter.

BRIEF DESCRIPTION OF THE DRAWINGS

The details of one or more aspects of implementing a low-cost readout module for a lidar system are described in this document with reference to the following figures. The same numbers are used throughout the drawings to reference like features and components:

FIG. 3-1 illustrates an example readout module connected between a receiver and a processor of a lidar system.

FIG. 3-2 illustrates an example timing readout path of a readout module.

FIG. 3-3 illustrates an example intensity readout path of a readout module.

DETAILED DESCRIPTION

Overview

Automotive lidar systems are becoming one of the vital sensing technologies on which some vehicle-based subsystems rely for acquiring critical information about an environment surrounding a vehicle. For high frame-rate and long-range applications, it is desirable to increase the quantity of receive channels within a lidar system. A larger quantity of receive channels, for instance, can improve the angular resolution of the lidar system. Increasing the quantity of receive channels, however, can increase the cost of a readout module within the lidar system.

Some readout modules include an analog-to-digital converter for each receive channel to extract both timing information and intensity information. However, to generate accurate timing information and support high throughput, the analog-to-digital converters are designed to have a high-sampling rate and large bandwidth. As such, the analog-to-digital converters can be expensive. Furthermore, because the readout module uses an analog-to-digital converter for each receive channel, increasing the quantity of receive channels within the lidar system increases the quantity of analog-to-digital converts within the readout module, and therefore increases the cost of the lidar system. With fewer receive channels, the lidar system may not be able to achieve a target angular resolution.

Other readout modules include a time-to-digital converter for each receive channel to extract timing information. Although the time-to-digital converter is less expensive than a high-performance analog-to-digital converter, the time-to-digital converter is unable to extract intensity information. Without the intensity information, the lidar system is unable to determine reflective properties of the object, which can make it challenging to detect or classify the object.

To address this issue, this document describes techniques and systems that implement a low-cost readout module for a lidar system. In an example time-of-flight (ToF) lidar system, the low-cost readout module includes at least two readout paths, which are coupled to a receive channel of the lidar system. The two readout paths include a timing readout path and an intensity readout path. The timing readout path includes at least one threshold-triggered timing circuit, which generates time-sensitive information, such as timing data. The timing data can be used to detect an object and determine a distance to the object. In an example implementation, the threshold-triggered timing circuit includes a time-to-digital converter to identify a time associated with a rising edge of a pulse. The time-to-digital converter can be less expensive than an analog-to-digital converter. In some implementations, the timing readout path includes another threshold-triggered timing circuit to confirm that the time identified by time-to-digital converter is associated with a pulse instead of noise.

The intensity readout path generates non-time-sensitive information, such as intensity data, which can be used to detect and/or classify the object. The intensity readout path includes a hold-and-sample circuit. In an example implementation, the hold- and sample circuit includes a hold circuit and an analog-to-digital converter. By including the hold circuit, a low-performance analog-to-digital converter can sample an output of the hold circuit. The low-performance analog-to-digital converter can operate at a slower sampling rate and have a smaller bandwidth relative to other high-performance analog-to-digital converters that can provide both time-sensitive information and non-time-sensitive information. In some implementations, a low-performance analog-to-digital converter can be shared by multiple intensity readout paths to reduce size or complexity of the readout module. By utilizing a threshold-triggered timing circuit to provide time-sensitive data and a hold-and-sample circuit to provide non-time-sensitive information, the readout module can have a lower cost than other readout modules that utilize a high-performance analog-to-digital converter for each receive channel.

Example Environment

Figure 1:
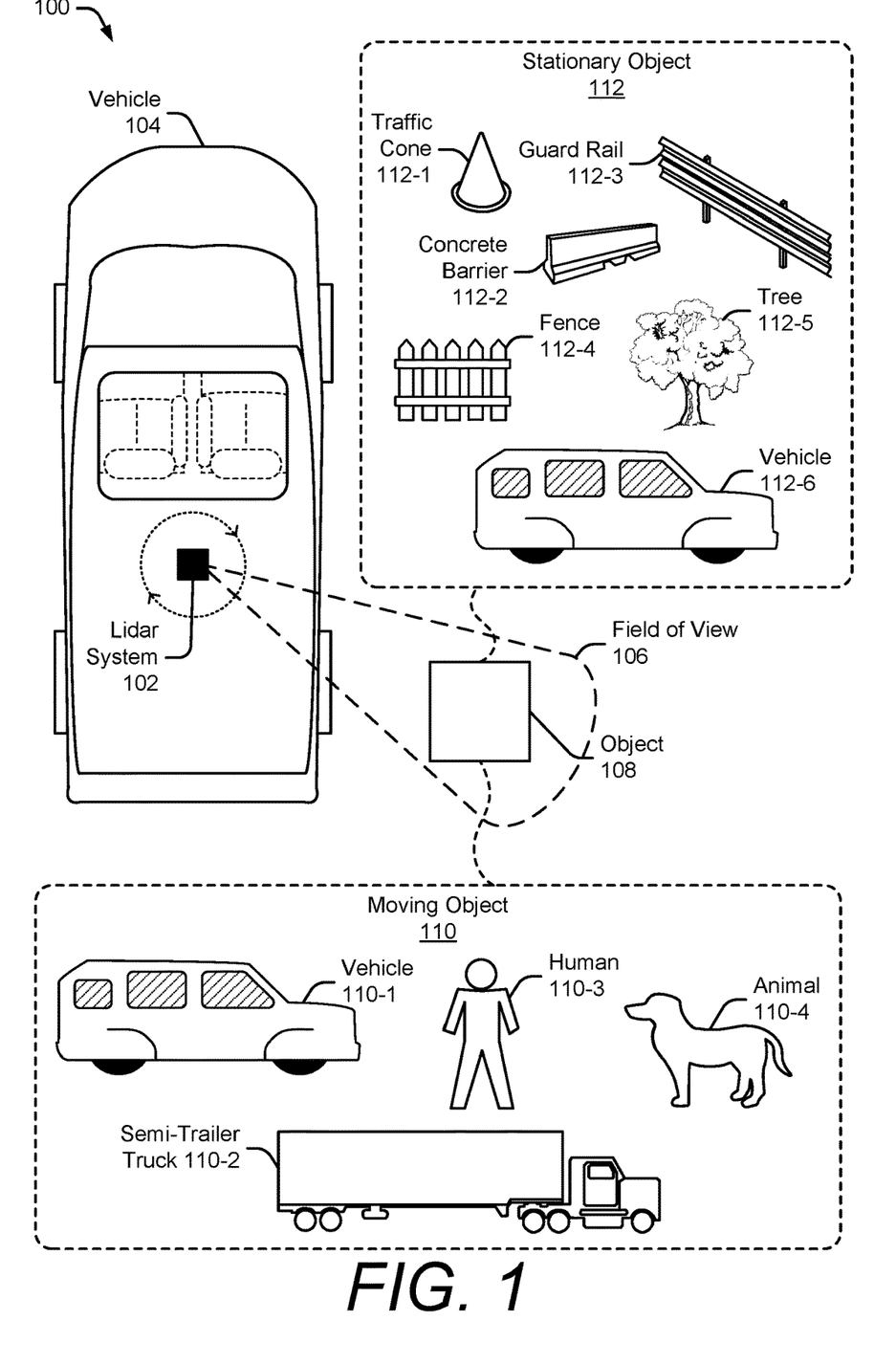
FIG. 1 illustrates an example environment in which a lidar system with a low-cost readout module can be implemented.

FIG. 1 is an illustration of an example environment 100 in which techniques using, and an apparatus including, a lidar system 102 with a low-cost readout module may be embodied. In the depicted environment 100, the lidar system 102 is mounted to, or integrated within, a vehicle 104. The lidar system 102 is capable of detecting one or more objects 108 that are within proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow, or include, a trailer or other attachments. In general, the lidar system 102 can be mounted to any type of moving platform, including moving machinery or robotic equipment.

In the depicted implementation, the lidar system 102 is mounted on top of the vehicle 104 and provides a field of view 106 illuminating an object 108. In other implementations, the lidar system 102 can be mounted to a front side, a backside, a left side, or a right side of the vehicle 104. In some cases, the vehicle 104 includes multiple lidar systems 102, such as a first rear-mounted lidar system 102 positioned near a left side of the vehicle 104 and a second rear-mounted lidar system 102 positioned near a right side of the vehicle 104. In general, locations of the one or more lidar systems 102 can be designed to provide a particular field of view 106 that encompasses a region of interest in which the object 108 may be present. Example fields of view 106 include a 360-degree field of view, one or more 180-degree fields of view, one or more 90-degree fields of view, and so forth, which can overlap (e.g., four 120-degree fields of view).

In general, the object 108 is composed of one or more materials that reflect lidar signals. Depending on the application, the object 108 can represent a target of interest or clutter. In some cases, the object 108 is a moving object 110, such as another vehicle 110-1, a semi-trailer truck 110-2, a human 110-3, or an animal 110-4. In other cases, the object 108 represents a stationary object 112, such as traffic cone 112-1, a concrete barrier 112-1, a guard rail 112-3, a fence 112-4, a tree 112-5, a parked vehicle 112-6, or a reflector on the road. The stationary object 112 may even comprise a road barrier, which can be continuous or discontinuous along a portion of the road.

The lidar system 102 represents a time-of-flight lidar system, which transmits and receives lidar signals comprised of pulses. The lidar system 102 measures a distance to the object 108 based on a time it takes for the pulses to travel from the lidar system 102 to the object 108, and from the object 108 back to the lidar system 102. The lidar system 102 can also measure reflective properties of the object 108 based on the intensity of the received pulses. The intensity information can be used to determine the type of object 108 detected or classify the object 108. As an example, the lidar system 102 can determine whether the object 108 is a vehicle 112-6, a lane marker, a surface of a road, or a human 110-3. The intensity information also enables the lidar system 102 to determine a property of the object 108, such as a material composition of the object 108. The lidar system 102 and the vehicle 104 are further described with respect to FIG. 2.

Figure 2:
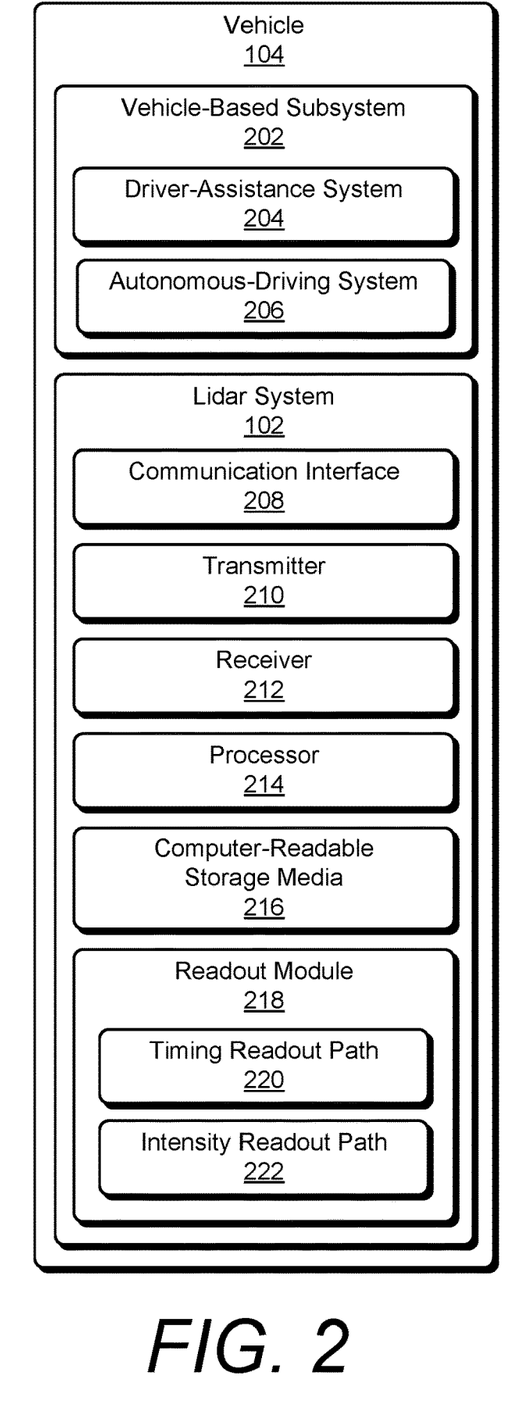
FIG. 2 illustrates an example implementation of a lidar system as part of a vehicle.

FIG. 2 illustrates the lidar system 102 as part of the vehicle 104. The vehicle 104 includes at least one vehicle-based subsystem 202, such as a driver-assistance system 204 and/or an autonomous-driving system 206. Generally, the vehicle-based subsystem 202 uses lidar data provided by the lidar system 102 to perform a function. For example, the driver-assistance system 204 provides blind-spot monitoring and generates an alert that indicates a potential collision with an object 108 that is detected by the lidar system 102. In this case, the lidar data from the lidar system 102 is used to indicate when it is safe or unsafe to change lanes.

As another example, the autonomous-driving system 206 may move the vehicle 104 to a particular location while avoiding collisions with other objects 108 detected by the lidar system 102. The lidar data provided by the lidar system 102 can provide information about the location and movement of the other objects 108 to enable the autonomous-driving system 206 to perform emergency braking, perform a lane change, or adjust the vehicle 104's speed.

The lidar system 102 includes a communication interface 208 to transmit the lidar data to the vehicle-based subsystem 202 or to another component of the vehicle 104 over a communication bus of the vehicle 104, for example, when the individual components shown in the lidar system 102 are integrated within the vehicle 104. In general, the lidar data provided by the communication interface 208 is in a format usable by the vehicle-based subsystem 202. In some implementations, the communication interface 208 may provide information to the lidar system 102, such as the speed of the vehicle 104 or whether a turning blinker is on or off. The lidar system 102 can use this information to appropriately configure itself. For example, the lidar system 102 can adjust its frame rate or scanning speed based on the speed of the vehicle 104. Alternatively, the lidar system 102 can dynamically adjust the field of view 106 based on whether a right-turning blinker or a left-turning blinker is on. Other types of adjustments can include parameters of threshold detectors or analog-to-digital converters within the lidar system 102, such as those within a readout-module 218, which is further described below.

The lidar system 102 also includes a transmitter 210 to transmit lidar signals and a receiver 212 to receive reflected versions of these lidar signals. The transmitter 210 includes optical elements for emitting lidar signals and related components for directing the lidar signals. The transmitter 210 can form beams that are steered or un-steered, and wide or narrow. The steering and shaping can be achieved through analog beamforming or digital beamforming. The receiver 212 includes optical elements for detecting the reflected lidar signals, such as photodetectors. In some implementations, the photodetector is implemented as a silicon photomultiplier (SiPM).

The lidar system 102 also includes one or more processors 214 and computer-readable storage media (CRM) 216. The processor 214 can be implemented as a microprocessor or a system-on-chip. The processor 214 executes instructions that are stored within the computer-readable storage media.

As an example, the processor 214 can determine a location of the object 108 (of FIG. 1) relative to the lidar system 102 (e.g., determine a slant range, azimuth, and elevation to the object 108), determine the material composition of the object 108, or classify the object 108. In general, the processor 214 detects the object 108 based on information provided by the receiver 212. The processor 214 also generates the lidar data for the vehicle-based subsystem 202.

The lidar system 102 also includes a readout module 218. The readout module 218 provides an interface between the receiver 212 and the processor 214. In some implementations, the readout module 218 is incorporated within the receiver 212 and implemented on the same integrated circuit. In other implementations, the readout module 218 is separate from the receiver 212 and implemented on a different integrated circuit (or multiple integrated circuits). In still other implementations, a portion of the readout module 218 can also be implemented by the processor 214, as further described below.

Generally, the readout module 218 extracts information from analog signals provided by the receiver 212 and generates digital information for the processor 214. To reduce the cost of the readout module 218, the readout module 218 separately determines time-sensitive information and non-time-sensitive information for each receive channel within the receiver 212. The readout module 218 includes at least one timing readout path 220 and at least one intensity readout path 222, which are further described with respect to FIGS. 3-1 to 3-3.

Figure 31:
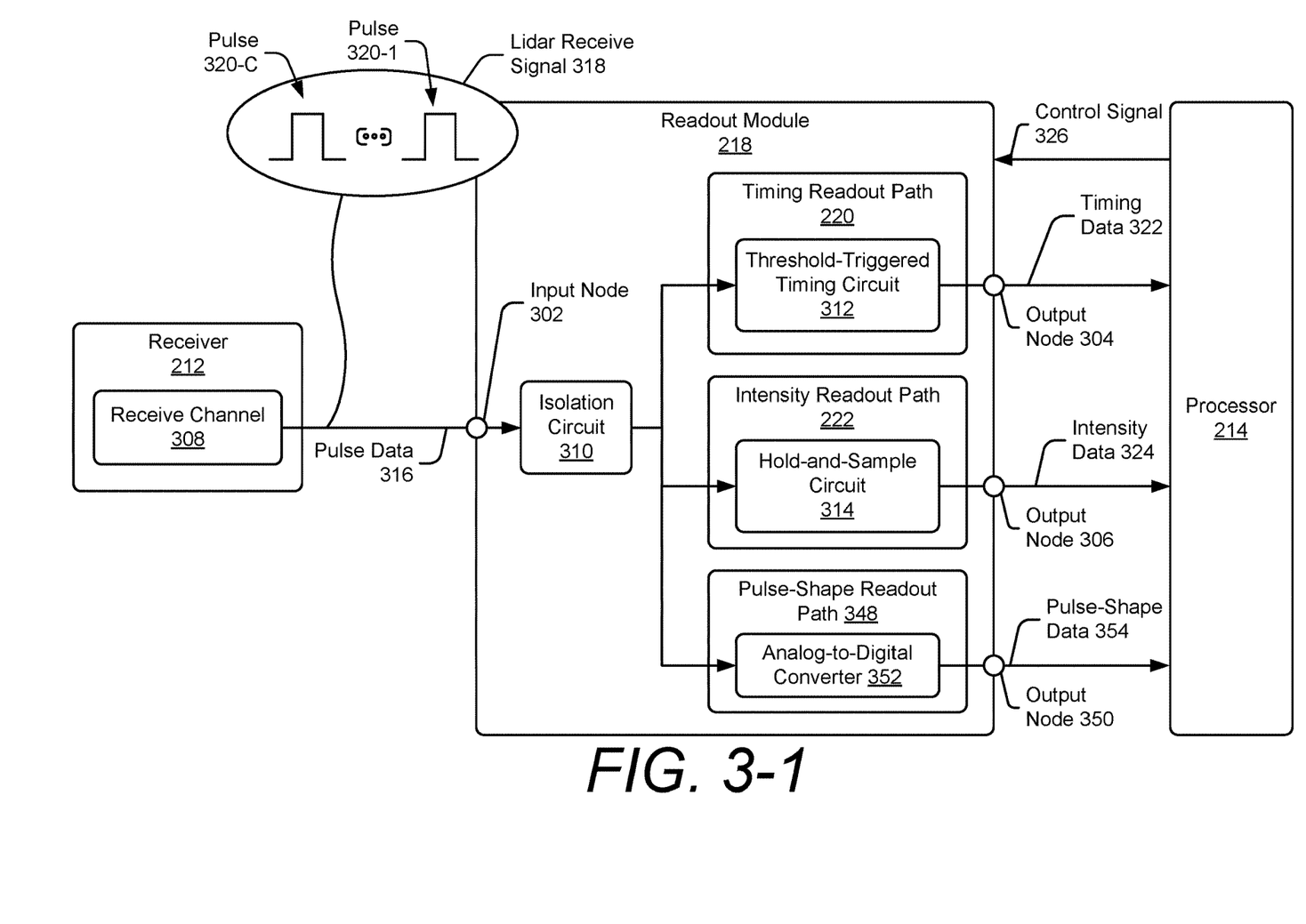

FIG. 3-1 illustrates an example readout module 218 connected between the receiver 212 and the processor 214. In the depicted configuration, the readout module 218 includes the timing readout path 220 and the intensity readout path 222 of FIG. 2. The readout module 218 also includes at least one input node 302, at least one output node 304, and at least another output node 306. The input node 302 is coupled to the receiver 212, and the output nodes 304 and 306 are coupled to the processor 214. The receiver 212 includes at least one receive channel 308, which is coupled to the input node 302.

The timing readout path 220 is coupled between the input node 302 and the output node 304. The intensity readout path 222 is coupled between the input node 302 and the output node 306. In general, both the timing readout path 220 and the intensity readout path 222 are coupled to the same input node 302 and therefore operate on similar input data. The timing readout path 220 generates time-sensitive information based on the input data, and the intensity readout path 222 generates non-time-sensitive information based on the input data. In some cases, the timing readout path 220 analyzes information within the input data that varies at a faster rate than the information analyzed by the intensity readout path 222.

In some implementations, other components are coupled between the input node 302 and both the timing readout path 220 and the intensity readout path 222. In the depicted configuration, for instance, the readout module 218 includes an isolation circuit 310. The isolation circuit 310 isolates the timing readout path 220 and the intensity readout path 222 from the receive channel 308. The isolation circuit 310 can be implemented using a buffer or a current mirror. In some cases, the isolation circuit 310 additionally provides current-to-voltage conversion and/or amplification. For example, the isolation circuit 310 can include a current-to-voltage converter, which generates a voltage based on an input current provided at the input node 302. The current-to-voltage converter can be implemented using a transimpedance amplifier (TIA), for instance. In other implementations, the isolation circuit 310 can be implemented within the receiver 212 (e.g., between the receive channel 308 and the input node 302).

Figure 32:
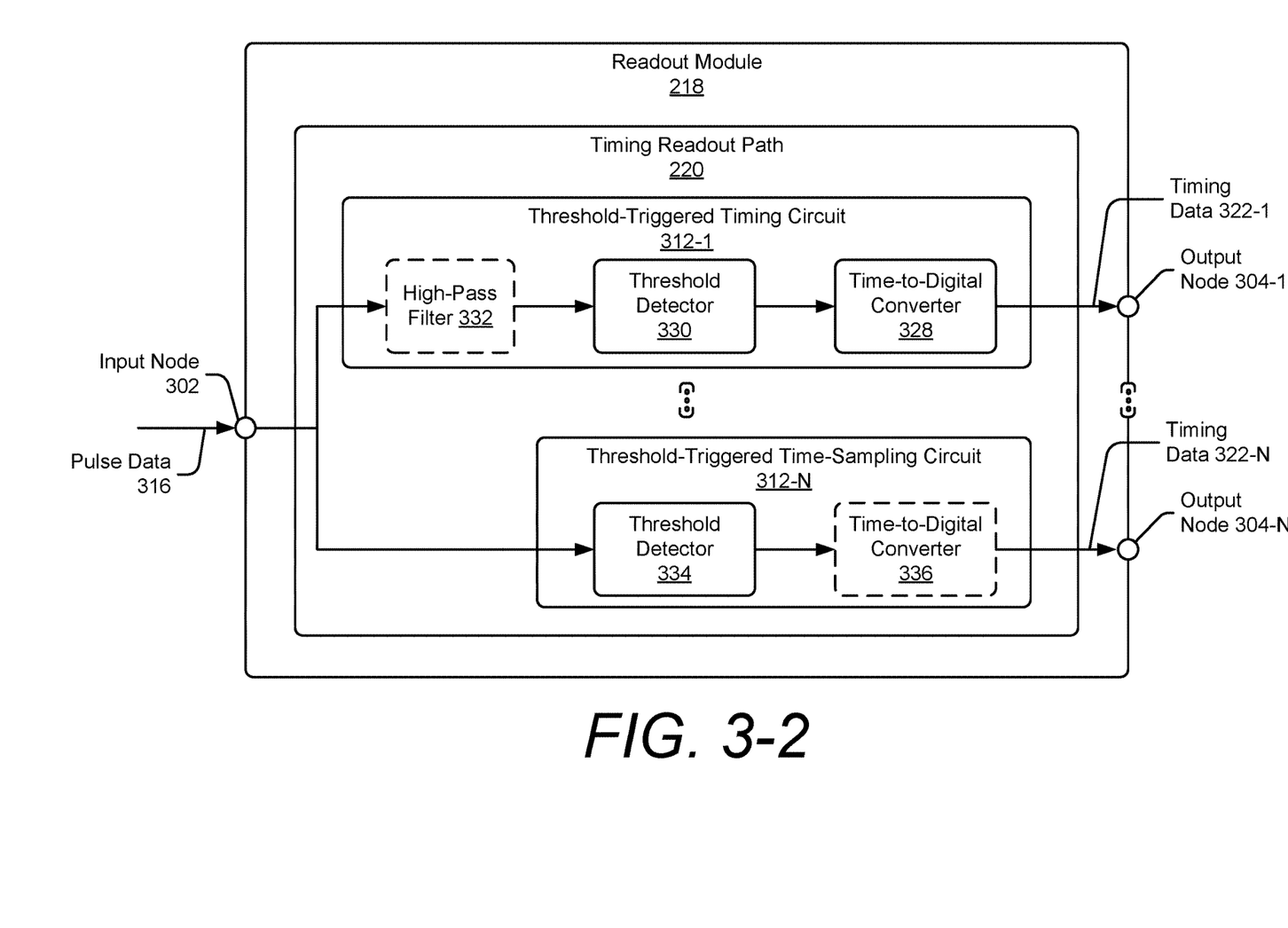

The timing readout path 220 includes at least one threshold-triggered timing circuit 312, which can be implemented within a system-on-chip (SoC). The threshold-triggered timing circuit 312 determines times associated with a voltage or current being greater than, equal to, or less than a threshold. The threshold-triggered timing circuit 312 can include at least one threshold detector and at least one time-capture circuit, such as a time-to-digital converter. An example implementation of the threshold-triggered timing circuit 312 with a time-to-digital converter is further described with respect to FIG. 3-2. A threshold of the threshold-triggered timing circuit 312 can be pre-programmed or controlled by the processor 214, as further described below. In some implementations, at least a portion of the threshold-triggered timing circuit 312 is implemented by the processor 214.

Figure 33:
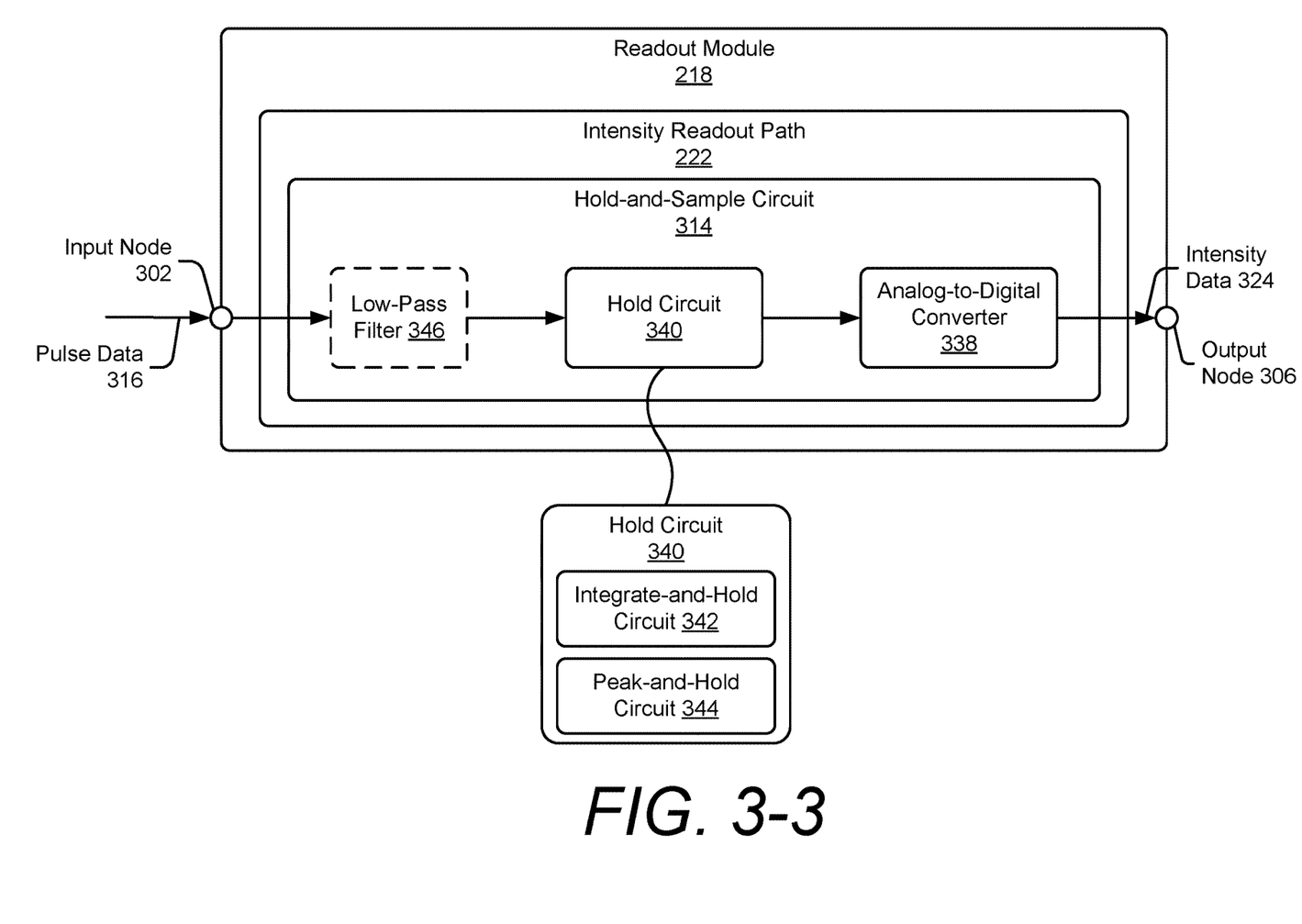

The intensity readout path 222 includes at least one hold-and-sample circuit 314. The hold-and-sample circuit 314 processes and holds an input signal for a specified duration and samples the input signal. The hold duration and sampling rate of the hold-and-sample circuit 314 can be pre-programmed or controlled by the processor 214, as further described below. The hold-and-sample circuit 314 can also perform analog-to-digital conversion. An example implementation of the hold-and-sample circuit 314 with a hold circuit and an analog-to-digital converter is further described with respect to FIG. 3-3.

During operation, the receive channel 308 of the receiver 212 generates pulse data 316. The pulse data 316 represents a response of the lidar system 102 to a lidar receive signal 318. The lidar receive signal 318 can represent a version of a lidar transmit signal that is transmitted by the transmitter 210 (of FIG. 3) and reflected by the object 108 (of FIG. 1). The lidar receive signal 318 includes multiple pulses 320, such as pulses 320-1 to 320-C, where "C" represents a positive integer. As an example, the quantity of pulses 320 within the lidar receive signal 318 can be on the order of hundreds or thousands. A duration (e.g., pulse width) of each pulse 320 can be on the order of nanoseconds, such as between one and twenty nanoseconds. An interval between each pulse 320 can be on the order of microseconds, such as between one and five microseconds, for example. In general, the pulse data 316 is a time-domain analog signal that includes timing information and intensity information of the pulses 320-1 to 320-C.

The readout module 218 accepts the pulse data 316, which can be represented by an input voltage or an input current. The readout module 218 provides the pulse data 316 to both the timing readout path 220 and the intensity readout path 222. Both the timing readout path 220 and the intensity readout path 222 accept and process the pulse data 316.

The timing readout path 220 generates timing data 322 based on the pulse data 316. The timing data 322 can represent times associated with the pulses 320-1 to 320-C, such as times associated with rising edges or falling edges of the pulses 320-1 to 320-C. In particular, the threshold-triggered timing circuit 312 determines times associated with a voltage or current of the pulse data 316 being greater than, equal to, or less than a threshold.

The intensity readout path 222 generates intensity data 324 based on the pulse data 316. The intensity data 324 represents amounts of energy associated with the pulses 320-1 to 320-C (e.g., represents the number of photons associated with each optical pulse that is received by the receiver 212). In particular, the hold-and-sample circuit 314 extends durations for which intensity information of the pulses 320-1 to 320-C is available and samples the pulses 320-1 to 320-C. The intensity data 324 is composed of these samples.

The processor 214 analyzes the timing data 322 and/or the intensity data 324 associated with the pulses 320-1 to 320-C to detect the object 108. The processor 214 can also use the timing data 322 to measure a distance between the lidar system 102 and the object 108. Additionally, the processor 214 can use the intensity data 324-1 to 324-M to determine a material composition of the object 108 and/or classify the object 108. Information regarding the object 108's distance and classification can be provided as lidar data to the vehicle-based subsystems 202 of FIG. 2.

In some implementations, the processor 214 or a controller (not shown) controls operations of one or more components within the readout module 218. For example, the processor 214 can generate a control signal 326 and provide the control signal 326 to the readout module 218. The readout module 218 can set the threshold of the threshold-triggered timing circuit 312, set a duration that the hold-and-sample circuit 314 holds the pulse data 316, or set a sampling rate of the hold-and-sample circuit 314 based on the control signal 326. In this way, parameters of the readout module 218 can be dynamically adjusted by the processor 214 depending on the type of lidar signal transmitted or an operational mode of the lidar system 102.

The readout module 218 can optionally include at least one pulse-shape readout path 348 and at least one output node 350. The pulse-shape readout path 348 is coupled between the input node 302 and the output node 350, and includes at least one analog-to-digital converter 352. Although not shown, the pulse-shape readout path 348 can also include a low-pass filter, which is coupled between the input node 302 and the analog-to-digital converter 352.

During operation, the pulse-shape readout path 348 uses the analog-to-digital converter 352 to generate pulse-shape data 354 based on the pulse data 316. The pulse-shape data 354 can include timing information and intensity information, which characterizes a shape of the pulse 320. Generally, a sampling rate of the analog-to-digital converter 352 is sufficient to capture an approximate shape of the pulse 320. To reduce cost, the analog-to-digital converter 352 can be implemented using a low-performance analog-to-digital converter. As such, the processor 214 can rely on the timing data 322 instead of the pulse-shape data 354 to measure a distance to the object 108.

Sometimes the timing data 322 is not available for the pulse 320. This can occur, for instance, if the amplitude of the pulse 320 is below a threshold evaluated by the threshold-triggered timing circuit 312. In this case, the width of the pulse 320 can be sufficiently wide to enable the sampling rate of the analog-to-digital converter 352 to collect multiple samples and generate the pulse-shape data 354. In other words, the sampling rate of the analog-to-digital converter 352 enables at least one sample to be collected during a rising edge of the pulse 320, at least one sample to be collected during a falling edge of the pulse 320, and at least one sample collected between these samples. The processor 214 can analyze the pulse-shape data 354 to detect the object 108 and measure the distance to the object 108 for situations in which the timing data 322 is not available.

FIG. 3-2 illustrates an example timing readout path 220 of the readout module 218. In the depicted configuration, the timing readout path 220 includes threshold-triggered timing circuits 312-1 to 312-N and output nodes 304-1 to 304-N, where "N" represents a positive integer. The threshold-triggered timing circuit 312-1 is coupled between the input node 302 and the output node 304-1. The threshold-triggered timing circuit 312-N is coupled between the input node 302 and the output node 304-N. Although not shown, the isolation circuit 310 of FIG. 3 can be coupled between the input node 302 and the threshold-triggered timing circuits 312-1 to 312-N.

The threshold-triggered timing circuits 312-1 includes a time-to-digital converter 328 and a threshold detector 330. Although the threshold detector 330 and the time-to-digital converter 328 are shown to be separate components, some implementations can integrate the threshold detector 330 and the time-to-digital converter 328 together. In other implementations, the time-to-digital converter 328 can be implemented by the processor 214 (of FIG. 3-1). The time-to-digital converter 328 is coupled between the input node 302 and the output node 304-1. The threshold detector 330 is coupled between the input node 302 and the time-to-digital converter 328. The time-to-digital converter 328 generates digital timing information based on a trigger generated by the threshold detector 330. The threshold-triggered timing circuit 312-1 optionally includes a high-pass filter 332. The high-pass filter 332 can be coupled between the input node 302 and the threshold detector 330.

The threshold-triggered timing circuit 312-1 of FIG. 3-2 can implement the threshold-triggered timing circuit 312 of FIG. 3-1. Other ones of the threshold-triggered timing circuit 312-2 to 312-N can have one or more components that are similar to the components within the threshold-triggered timing circuit 312-1.

In the depicted configuration, the threshold-triggered timing circuit 312-N includes a threshold detector 334, which is coupled between the input node 302 and the output node 304-N. If the threshold-triggered timing circuit 312-1 includes the high-pass filter 332, the threshold detector 334 can be coupled to either an input of the high-pass filter 332 (as shown in FIG. 3-2) or an output of the high-pass filter 332 (not shown in FIG. 3-2). The threshold-triggered timing circuit 312-N can optionally include a time-to-digital converter 336. The time-to-digital converter 336 is coupled between the threshold detector 334 and the output node 304-N. Although not shown, other ones of the threshold-triggered timing circuit 312-2 to 312-(N–1) can include another threshold detector, another time-to-digital converter, another high-pass filter, or some combination thereof.

During operation, the high-pass filter 332 attenuates low-frequency noise within the pulse data 316 to improve a signal-to-noise ratio of the pulse data 316. The threshold detector 330 monitors a voltage or a current associated with the filtered pulse data 316. The threshold detector 330 compares the monitored voltage or current to a threshold and triggers the time-to-digital converter 328 responsive to a condition associated with the comparison being satisfied (e.g., based on the monitored voltage or current being greater than, equal to, or less than the threshold). A value of the threshold can be set based on a noise floor of the receiver 212, for instance. The voltage threshold can be approximately 0.1 volts, for instance.

The time-to-digital converter 328 generates timing data 322-1 based on the trigger provided by the threshold detector 330. In particular, the time-to-digital converter 328 identifies a time that the filtered pulse data 316 satisfied the condition evaluated by the threshold detector 330. Depending on the condition, this time can be associated with a rising edge or a falling edge of a pulse 320 within the pulse data 316. For example, the time-to-digital converter 328 generates the timing data 322-1, which indicates times associated with rising edges of the pulses 320-1 to 320-C within the pulse data 316 (e.g., times at which voltages of the pulses 320-1 to 320-C are greater than or equal to the threshold).

The threshold-triggered timing circuit 312-N performs similar operations as described above using the threshold detector 334 and/or the time-to-digital converter 336. For example, the threshold detector 334 also monitors the voltage or current associated with the pulse data 316. The threshold detector 334 compares the monitored voltage or current to another threshold, which differs from the threshold evaluated by the threshold detector 330. As an example, the threshold used by the threshold detector 334 can be greater than the threshold used by the threshold detector 330. This threshold can be between approximately 0.2 volts and 0.5 volts, for instance. Using the threshold detector 334, the threshold-triggered timing circuit 312-N generates timing data 322-N.

If the threshold evaluated by the threshold detector 334 is greater than the threshold evaluated by the threshold detector 330, the timing data 322-N generated using the threshold detector 334 can be used to verify that the time measured by the time-to-digital converter 328 is associated with one of the pulses 320 instead of noise. In this way, the processor 214 can reference the timing data 322-N to analyze portions of the timing data 322-1 that are likely to be associated with one of the pulses 320 and filter (e.g., discard) portions of the timing data 322-1 that are likely to be associated with noise.

In another implementation, the threshold-triggered timing circuit 312-N includes the time-to-digital converter 336. In this case, the timing data 322-N can include times at which the condition monitored by the threshold detector 334 is satisfied. As an example, the timing data 322-N can include a time at which a rising edge of a pulse 320 reaches another a voltage level. In this situation, the processor 214 can analyze the timing data 322-1 and the timing data 322-N to estimate a shape of the pulse 320.

FIG. 3-3 illustrates an example intensity readout path 222 of the readout module 218. In the depicted configuration, the intensity readout path 222 includes the hold-and-sample circuit 314. The hold-and-sample circuit 314 includes an analog-to-digital converter 338 and a hold circuit 340. The analog-to-digital converter 338 is coupled between the input node 302 and the output node 306. The hold circuit 340 is coupled between the input node 302 and the analog-to-digital converter 338. The hold circuit 340 enables the analog-to-digital converter 338 to operate at a slow sampling frequency, as further described below.

The hold circuit 340 can be implemented as an integrate-and-hold circuit 342 or a peak-and-hold circuit 344. The integrate-and-hold circuit 342 measures an amount of charge within the pulse 320 (e.g., measures an amount of current or voltage over time) and generates a voltage, which represents the intensity of the pulse 320. The peak-and-hold circuit 344 measures a peak amplitude of a current or voltage across the pulse 320 and generates a voltage, which represents the intensity of the pulse 320. As such, the intensity data 340 can include the amount of charge measured by the integrate-and-hold circuit 342 or the peak amplitude measured by the peak-and-hold circuit 344. The intensity data 340 can represent a scaled quantity of photons that are received within an optical pulse of the lidar receive signal 318.

The hold-and-sample circuit 314 can optionally include a low-pass filter 346. The low-pass filter 346 can be coupled between the input node 302 and the hold circuit 340, or coupled between the hold circuit 340 and the analog-to-digital converter 338. The low-pass filter 346 can be used to attenuate high-frequency noise within the pulse 320. By attenuating the noise, the low-pass filter 346 improves a measurement accuracy of the hold circuit 340.

Within the intensity readout path 222, the hold circuit 340 generates an output voltage that represents an amount of energy (e.g., an amount of charge measured by the integrate-and hold circuit 342 or a peak amplitude measured by the peak-and-hold circuit 344) associated with the pulse 320 and maintains the output voltage for a duration that is longer than a duration of the pulse 320. In this way, the intensity readout path 222 extends a duration of the pulse data 316, which enables the analog-to-digital converter 338 to sample data associated with each pulse 320 over a time period that is longer than a duration of the pulse 320. The duration that the output voltage is held can be limited based on the time interval between the transmitted pulses or a target resolution for distinguishing between different objects 108. In some implementations, the processor 214 sets the duration using the control signal 326 (of FIG. 3-1). This can include setting a time that the hold circuit 340 resets.

The analog-to-digital converter 338 collects one or more samples of the output voltage and generates the intensity data 324, which indicates an amount of the energy associated with the pulse 320. By using the hold circuit 340 to hold the output voltage, the analog-to-digital converter 338 can operate at a slower sampling rate relative to other high-performance analog-to-digital converters that generate both timing data and intensity data. This enables the analog-to-digital converter 338 to be implemented using a low-performance analog-to-digital converter. In some implementations, the processor 214 sets the sampling rate of the analog-to-digital converter 338 using the control signal 326 (of FIG. 3-1). Example implementations of the readout module 218 for supporting multiple receive channels within the receiver 212 are further described with respect to FIGS. 4 and 5.

Figure 4:
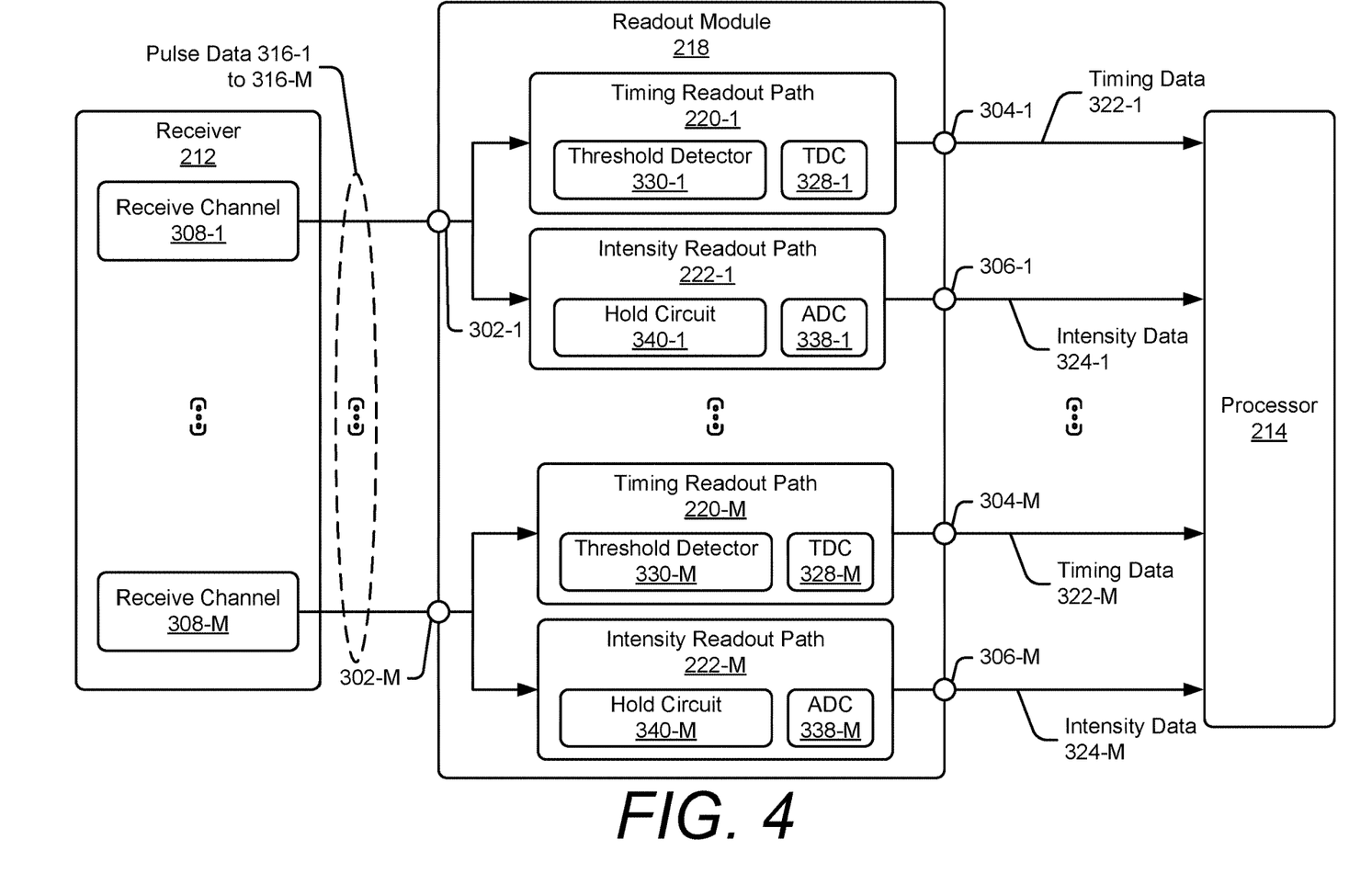
FIG. 4 illustrates an example readout module for supporting multiple receive channels.

FIG. 4 illustrates an example readout module 218 for supporting multiple receive channels 308-1 to 308-M of the receiver 212. The variable "M" represents a positive integer, which can be equal to two, three, four, six, twelve, twenty-four, and so forth. In the depicted configuration, the readout module 218 includes input nodes 302-1 to 302-M, timing readout paths 220-1 to 220-M, intensity readout paths 222-1 to 222-M, output nodes 304-1 to 304-M, and output nodes 306-1 to 306-M.

The readout module 218 is coupled between the receiver 212 and the processor 214. In particular, the input nodes 302-1 to 302-M are respectively coupled to the receive channels 308-1 to 308-M. The processor 214 is coupled to the output nodes 304-1 to 304-M and 306-1 to 306-M.

The timing readout paths 220-1 to 220-M each include at least one threshold-triggered timing circuit 312. The time-to-digital converters 328-1 to 328-M and the threshold detectors 330-1 to 330-M shown in FIG. 4 represent respective threshold-triggered timing circuits 312 of the timing readout paths 220-1 to 220-M. Although not shown, the timing readout paths 220-1 to 220-M can include additional threshold-triggered timing circuits 312, such as the threshold-triggered timing circuit 312-N of FIG. 3-2.

The intensity readout paths 222-1 to 222-M each include at least one hold-and-sample circuit 314. The analog-to-digital converters 338-1 to 338-M and the hold circuits 340-1 to 340-M shown in FIG. 4 represent respective hold-and-sample circuits 314 of the intensity readout paths 222-1 to 222-M. For simplicity, other components of the timing readout paths 220-1 to 220-M and the intensity readout paths 222-1 to 222-M are not shown. It is to be understood, however, that any of the components described above with respect to FIGS. 3-2 and 3-3 may also be present within the example implementation shown in FIG. 4.

During operation, the receive channels 308-1 to 308-M respectively provide pulse data 316-1 to 316-M to the input nodes 302-1 to 302-M. The timing readout paths 220-1 to 220-M respectively process the pulse data 316-1 to 316-M to generate timing data 322-1 to 322-M. Similarly, the intensity readout paths 222-1 to 222-M respectively process the pulse data 316-1 to 316-M to generate intensity data 324-1 to 324-M.

In FIG. 4, the intensity readout paths 222-1 to 222-M are independent and separate from each other. Consequently, the quantity of analog-to-digital converters 338-1 to 338-M is equal to the quantity of receive channels 308-1 to 308-M. Alternatively, the quantity of analog-to-digital converters 338 can be less than the quantity of receive channels 308, as described below with respect to FIG. 5.

Figure 5:
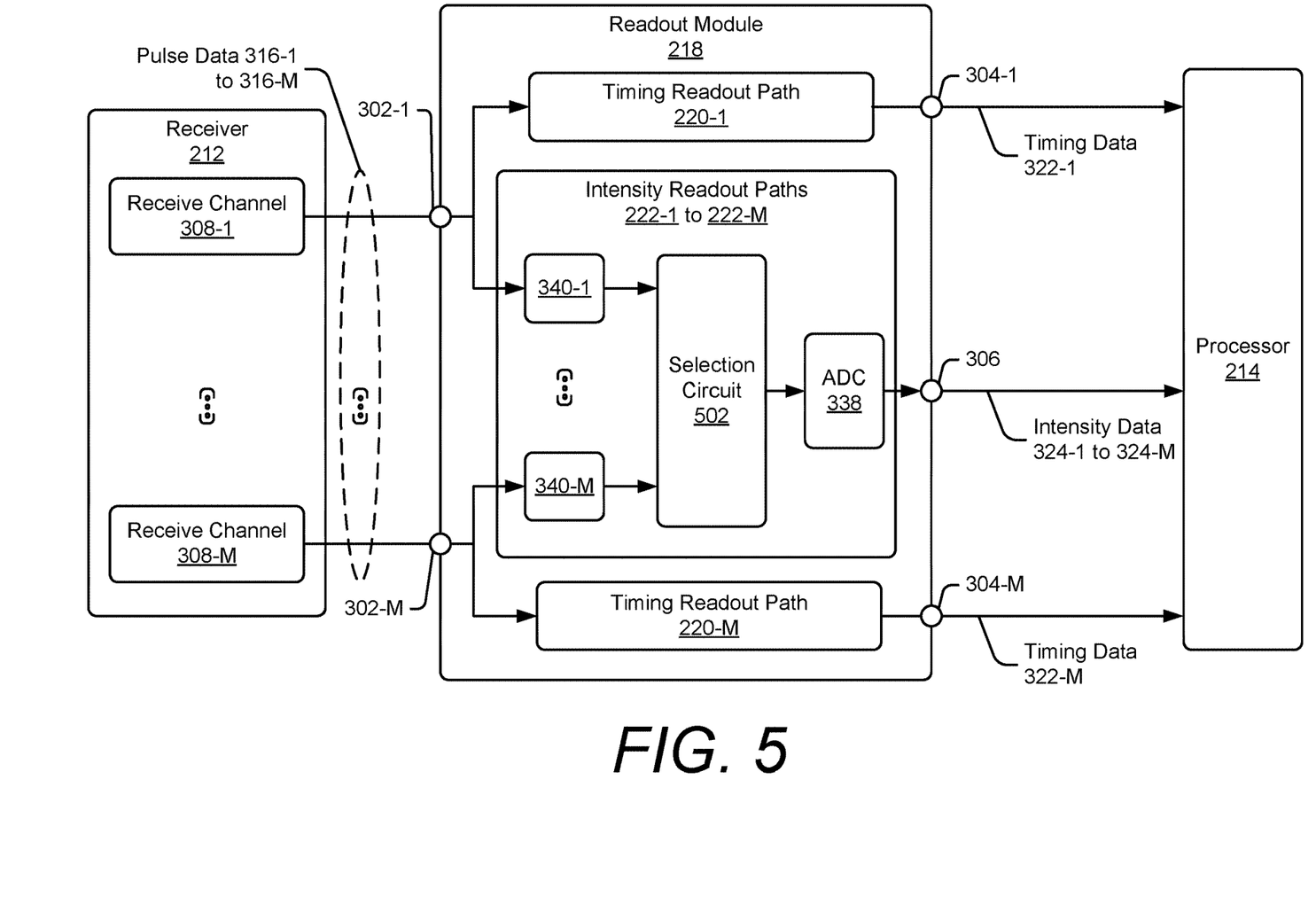
FIG. 5 illustrates another example readout module for supporting multiple receive channels.

FIG. 5 illustrates another example readout module 218 for supporting the multiple receive channels 308-1 to 308-M. In this example, two or more of the intensity readout paths 222-1 to 222-M share the analog-to-digital converter 338. Consequently, the readout module 218 of FIG. 5 has a fewer quantity of analog-to-digital converters 338 relative to the readout module 218 of FIG. 4. This can enable a size of the readout module 218 of FIG. 5 to be smaller than the readout module 218 of FIG. 4. Because the analog-to-digital converter 338 is shared across multiple intensity readout paths 222-1 to 222-M, a sampling rate of the analog-to-digital converter 338 of FIG. 5 may be faster than a sampling rate of the analog-to-digital converters 338 of FIG. 4. Consequently, the analog-to-digital converter 338 of FIG. 5 may be more expensive than one of the analog-to-digital converters 338 of FIG. 4.

Although the analog-to-digital converter 338 in FIG. 5 is shown to be shared between all of the intensity readout paths 222-1 to 222-M in FIG. 5, alternative implementations can share the analog-to-digital converter 338 across a subset of the intensity readout paths 222-1 to 222-M. Consider an example in which the readout module 218 includes multiple analog-to-digital converters 338. In a first case, two or more intensity readout paths 222-1 to 222-M share the analog-to-digital converter 338 while the remaining intensity readout paths 222-1 to 222-M respectively use the remaining analog-to-digital converters 338. In a second case, the intensity readout paths 222-1 to 222-M are divided into different groups, which include two or more intensity readout paths 222-1 to 222-M. The quantities of intensity readout paths 222 within the groups can be similar or different. The different groups respectively share different analog-to-digital converters 338. As an example, the receiver 212 includes twelve receive channels 308 (e.g., "M" equals twelve), and the readout module 218 includes four analog-to-digital converters 338. In this case, the intensity readout paths 222 are divided into groups of three, which utilize different analog-to-digital converters 338.

Each group of intensity readout paths 222 that share an analog-to-digital converter 338 also jointly include a selection circuit 502. The selection circuit 502 is coupled between the shared analog-to-digital converter 338 and the associated input nodes 302 of the intensity readout paths 222. In particular, the selection circuit 502 can be coupled between respective hold circuits 340 of the intensity readout paths 222 and the analog-to-digital converter 338. The selection circuit 502 can be implemented using one or more switches or a multiplexer. Although not explicitly shown, the processor 214 or a controller can control an order and duration in which the selection circuit 502 connects the input nodes 302-1 to 302-M to the analog-to-digital converter 338. For example, the processor 214 can control the selection circuit 502 using the control signal 326 of FIG. 3.

For simplicity, other components of the timing readout paths 220-1 to 220-M and the intensity readout paths 222-1 to 222-M are not shown in FIG. 5. It is to be understood, however, that any of the components described above with respect to FIGS. 3-2 and 3-3 may also be present within the example implementation shown in FIG. 5.

During operation, the receive channels 308-1 to 308-M respectively provide pulse data 316-1 to 316-M to the input nodes 302-1 to 302-M. The readout module 218 passes the pulse data 316-1 to 316-M to the timing readout paths 220-1 to 220-M and the intensity readout paths 222-1 to 222-M. The timing readout paths 220-1 to 220-M of FIG. 5 perform similar operations as the timing readout paths 220-1 to 220-M of FIG. 4.

In the depicted configuration, the selection circuit 502 selectively connects the hold circuits 340-1 to 340-M to the analog-to-digital converter 338. The selection circuit 502 can repeatedly cycle through connecting each of the 340-1 to 340-M to the analog-to-digital converter 338. The selection circuit 502 can enable a single sample or multiple samples to be collected from the hold circuit 340-1 prior to connecting the next hold circuit 340-2 to 340-M. In this way samples from different receive channels 308-1 to 308-M can be grouped together by pulse, interleaved, or some combination thereof.

Depending on the sampling rate of the analog-to-digital converter 338, the duration of the pulses 320, the time period between the pulses 320, and a target resolution for distinguishing between different objects 108, the hold circuit 340, the selection circuit 502, and the analog-to-digital converter 338 can be designed to enable multiple samples to be collected for each pulse data 316-1 to 316-M. The analog-to-digital converter 338 generates intensity data 324-1 to 324-M, which is provided to the processor 214. In particular, the intensity data 324-1 to 324-M is provided by a single signal, which represents a multiplexed version of the intensity data 324-1 to 324-M.

The processor 214 can include a demultiplexing circuit, which performs a reciprocal operation that extracts the intensity data 324-1 to 324-M from the multiplexed signal at the output node 306. This enables the processor 214 to recover information from each individual receive channel 308-1 to 308-M.

Example Method

Figure 6:
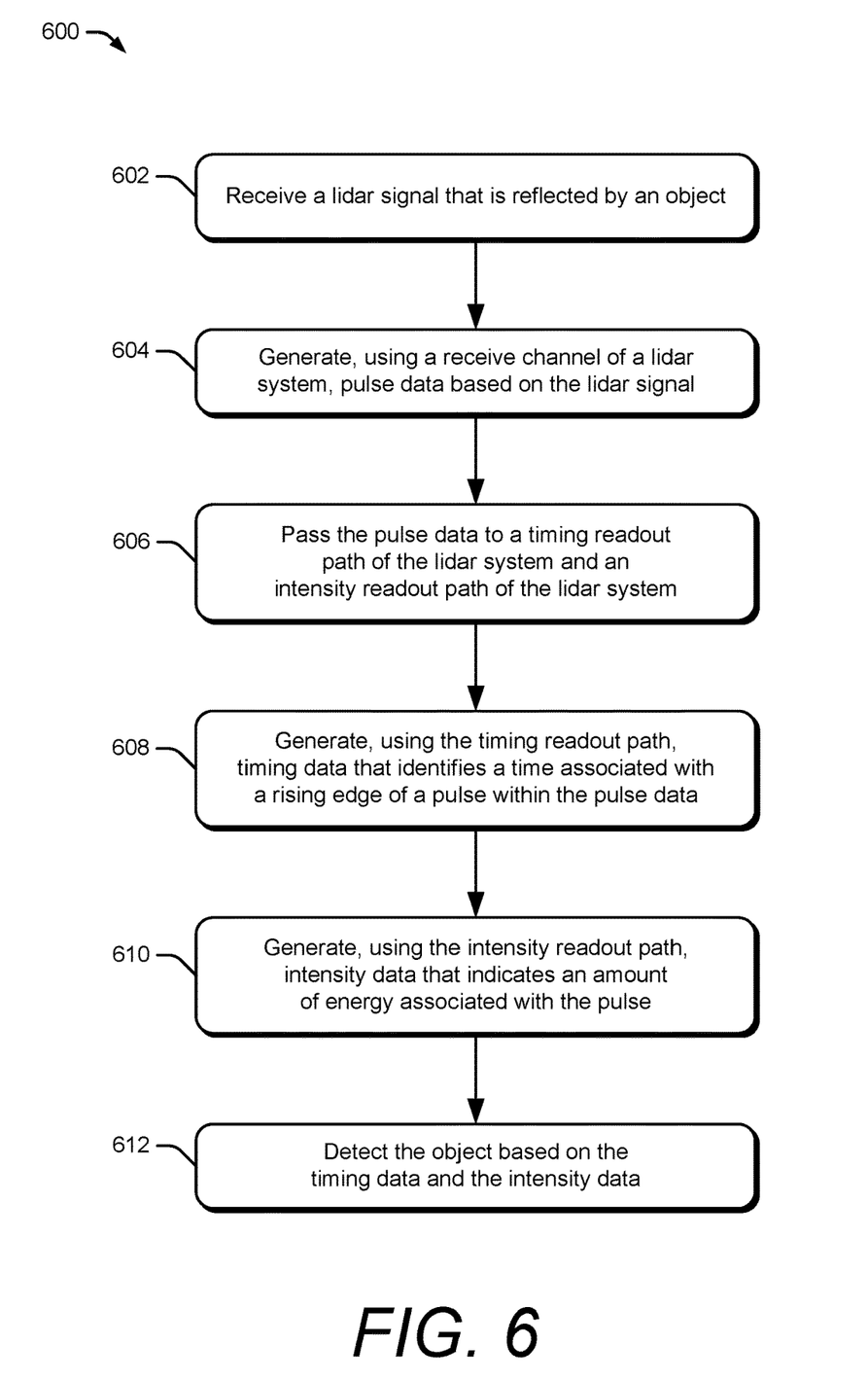
FIG. 6 illustrates an example method performed by a lidar system with a low-cost readout module.

FIG. 6 depicts an example method 600 for performing multiple readouts of a receive channel within a lidar system 102. Method 600 is shown as sets of operations (or acts) performed but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 2-5, reference to which is made for example only. The techniques are not limited to performance by one entity or multiple entities.

At 602, a lidar signal that is reflected by an object is received. For example, the receiver 212 of the lidar system 102 receives the lidar receive signal 318 (of FIG. 3-1).

At 604, pulse data is generated using a receive channel of a lidar system. The pulse data is based on the lidar signal. For example, the receive channel 308 of the receiver 212 generates the pulse data 316 based on the lidar receive signal 318, as shown in FIG. 3-1.

At 606, the pulse data is passed to a timing readout path of the lidar system and an intensity readout path of the lidar system. For example, the readout module 218 passes the pulse data 316 to the timing readout path 220 and the intensity readout path 222, as shown in FIG. 3-1. The pulse data 316 can be represented by a voltage or a current.

At 608, timing data is generated using the timing readout path. The timing data identifies a time associated with a rising edge of a pulse within the pulse data. For example, the timing readout path 220 generates the timing data 322, which identifies a time associated with a rising edge of a pulse 320 within the pulse data 316. In particular, the timing readout path 220 includes at least one threshold-triggered timing circuit 312 with a time-to-digital converter 328 and a threshold detector 330. The threshold-triggered timing circuit 312 can generate a timestamp that represents a time at which a rising edge of the pulse 320 is greater than or equal to a threshold. In some implementations, the timing readout path 220 includes another threshold-triggered timing circuit 312 with at least another threshold detector 334. The timing readout path 220 can utilize the threshold-triggered timing circuit 312 to indicate whether or not the timing data 322 is likely associated with the pulse 320 or noise.

At 610, intensity data is generated using the intensity readout path. The intensity data indicates an amount of energy within the pulse. For example, the intensity readout path 222 generates intensity data 324, which indicates an amount of energy within the pulse 320. In some examples, the intensity data 324 includes a measurement amount of charge associated with the pulse 320 or a measured amount of peak current associated with the pulse 320.

At 612, the object is detected based on the timing data and the intensity data. For example, the processor 214 detects the object 108 based on the timing data 322 and the intensity data 324. The processor 214 can also use the timing data 322 to measure a distance to the object 108. Additionally or alternatively, the processor 214 can identify a material composition of the object 108 or classify the object 108 based on the intensity data 324.

Some examples are described below.

Example 1: An apparatus comprising:
  a lidar system comprising:
    a receiver comprising a receive channel; and
    a readout module coupled to the receiver, the readout module comprising:
      a first node coupled to the receive channel;
      a second node and a third node;
      a timing readout path coupled between the first node and the second node, the timing readout path comprising a time-to-digital converter; and
      an intensity readout path coupled between the first node and the third node, the intensity readout path comprising an analog-to-digital converter.

Example 2: The apparatus of example 1, wherein:
  the receive channel is configured to generate pulse data based on a lidar receive signal;
  the timing readout path is configured to determine, using the time-to-digital converter, a time associated with a rising edge of a pulse within the pulse data; and
  the intensity readout path is configured to determine, using the analog-to-digital converter, an amount of energy associated with the pulse.

Example 3: The apparatus of example 2, wherein the lidar system comprises a processor coupled to the second node and the third node, the processor configured to:
analyze the time associated with the rising edge of the pulse and the amount of energy associated with the pulse to detect an object that reflected the lidar receive signal.

Example 4: The apparatus of example 1, wherein:
the readout module comprises a fourth node; and
the timing readout path comprises:
a first threshold detector coupled between the first node and the time-to-digital converter, the first threshold detector is configured to activate the time-to-digital converter responsive to a first voltage at an input of the first threshold detector being greater than or equal to a first voltage threshold; and
a second threshold detector coupled between the first node and the fourth node, the second threshold detector is configured to generate an output voltage responsive to a second voltage at an input of the second threshold detector being greater than or equal to a second voltage threshold, the second voltage threshold being greater than the first voltage threshold.

Example 5: The apparatus of example 4, wherein:
the time-to-digital converter comprises a first time-to-digital converter;
the timing readout path comprises a second time-to-digital converter coupled between the second threshold detector and the fourth node; and
the second threshold detector is configured to activate the second time-to-digital converter using the output voltage.

Example 6: The apparatus of example 4, wherein:
the timing readout path comprises a high-pass filter having an input coupled to the first node and an output coupled to an input of the first threshold detector; and
an input of the second threshold detector is coupled to either the input of the high-pass filter or the output of the high-pass filter.

Example 7: The apparatus of example 1, wherein:
the intensity readout path comprises a hold circuit coupled between the first node and the analog-to-digital converter; and
the hold circuit comprises an integrate-and-hold circuit or a peak-and-hold circuit.

Example 8: The apparatus of example 1, wherein:
the receive channel comprises a first receive channel;
the timing readout path comprises a first timing readout path;
the time-to-digital converter comprises a first time-to-digital converter;
the receiver comprises a second receive channel; and
the readout module comprises:
a fourth node coupled to the second receive channel;
a fifth node; and
a second timing readout path coupled between the fourth node and the fifth node, the second timing readout path comprising a second time-to-digital converter.

Example 9: The apparatus of example 8, wherein:
the intensity readout path comprises a first intensity readout path;
the analog-to-digital converter comprises a first analog-to-digital converter; and
the readout module comprises:
a sixth node; and
a second intensity readout path coupled between the fourth node and the sixth node, the second intensity readout path comprising a second analog-to-digital converter.

Example 10: The apparatus of example 8, wherein:
the intensity readout path comprises a first intensity readout path; and
the readout module comprises:
a selection circuit coupled to the first node, the fourth node, and the analog-to-digital converter; and
a second intensity readout path coupled between the fourth node and the third node; and
the first intensity readout path and the second intensity readout path each include the selection circuit and the analog-to-digital converter.

Example 11: The apparatus of example 1, wherein the apparatus comprises a vehicle.

Example 12: A method of a lidar system, comprising:
receiving a lidar signal that is reflected by an object;
generating, using a receive channel of the lidar system, pulse data based on the lidar signal;
passing the pulse data to a timing readout path of the lidar system and an intensity readout path of the lidar system;
generating, using the timing readout path, timing data that identifies a time associated with a rising edge of a pulse within the pulse data;
generating, using the intensity readout path, intensity data that indicates an amount of energy associated with the pulse; and
detecting the object based on the timing data and the intensity data.

Example 13: The method of example 12, further comprising:
triggering, using a threshold detector of the timing readout path, a time-to-digital converter of the timing readout path to determine the timing data responsive to an input voltage associated with the pulse data being greater than or equal to a voltage threshold;
generating, using a hold circuit of the intensity readout path, an output voltage that indicates the amount of energy associated with the pulse; and
sampling the output voltage using an analog-to-digital converter of the intensity readout path to generate the intensity data.

Example 14: The method of example 12, further comprising:
generating, using another receive channel of the lidar system, other pulse data based on the lidar signal;
pass the other pulse data to another timing readout path of the lidar system and another intensity readout path of the lidar system;
generate, using the other timing readout path, other timing data that identifies a time associated with a rising edge of another pulse within the other pulse data;
generating, using the other intensity readout path, other intensity data that indicates another amount of energy associated with the other pulse within the other pulse data, wherein:
detecting the object based on the timing data, the other timing data, the intensity data and the other intensity data.

Example 15: The method of example 14, further comprising:
selectively passing the pulse data and the other pulse data to an analog-to-digital converter that is included within both the intensity readout path and the other intensity readout path; and
interleaving the intensity data and the other intensity data together based on the passing of the pulse data and the other pulse data.

Example 16: A lidar system, comprising:
reception means for generating pulse data based on a lidar signal that is reflected by an object;
threshold-triggered means for generating timing data based on the pulse data, the timing data identifying times associated with rising edges of pulses within the pulse data; and
hold-and-sample means for generating intensity data by extending durations of the pulses within the pulse data and sampling the pulses, the intensity data indicating amounts of energy associated with the pulses, both the threshold-triggered means and the hold-and-sample means coupled to the reception means.

Example 17: The lidar system of example 16, wherein:
the threshold-triggered means comprises:
threshold means for generating triggers responsive to determining amplitudes associated with the rising edges of the pulses are greater than or equal to a threshold; and
time-to-digital conversion means for determining the times associated with the triggers; and
the hold-and-sample means comprises:
hold means for generating output voltages that represent amplitudes of the pulses; and
analog-to-digital conversion means for sampling the output voltages.

Example 18: The lidar system of example 16, further comprising:
other reception means for generating other pulse data based on the lidar signal;
other threshold-triggered means for generating other timing data based on the other pulse data; and
other hold-and-sample means for extending durations of other pulses within the pulse data to generate other intensity data based on samples of the other pulses, both the other threshold-triggered means and the other hold-and-sample means coupled to the other reception means.

Example 19: The lidar system of example 18, wherein the hold-and-sample means and the other hold-and-sample means jointly comprise multiplexing means for generating a multiplexed version of the intensity data and the other intensity data.

Example 20: The lidar system of example 18, wherein:
the hold-and-sample means comprises first analog-to-digital conversion means for generating the intensity data; and
the other hold-and-sample means comprises second analog-to-digital conversion means for generating the other intensity data.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The invention claimed is:

1. An apparatus comprising:
a lidar system that comprises:
a receiver comprising a receive channel configured to generate pulse data based on a lidar receive signal, the pulse data comprising at least a first pulse and a second pulse; and
a readout module coupled to the receiver and configured to output timing information and intensity information associated with the first pulse, the readout module comprising:
a first node coupled to the receive channel;
a second node and a third node;
a timing readout path, coupled between the first node and the second node and configured to output the timing information associated with a rising edge or a falling edge of the first pulse, the timing readout path comprising a time-to-digital converter; and
an intensity readout path coupled between the first node and the third node and configured to output the intensity information associated with the first pulse, the intensity readout path comprising:
an analog-to-digital converter configured to output sampled data associated with an intensity of the first pulse; and
a hold circuit, coupled between the first node and the analog-to-digital converter, configured to output a voltage associated with the intensity of the first pulse for an extended duration that does not exceed a combined duration of the first pulse and an interval between the first pulse and the second pulse, to allow the analog-to-digital converter sufficient time over the extended duration to sample the output, the extended duration being larger than the duration of the first pulse.

2. The apparatus of claim 1, wherein the lidar system comprises a processor coupled to the second node and the third node, the processor configured to:
analyze the time associated with the rising edge of the pulse and the intensity information associated with the pulse to detect an object that reflected the lidar receive signal.

3. The apparatus of claim 1, wherein:
the readout module comprises a fourth node; and
the timing readout path comprises:
a first threshold detector coupled between the first node and the time-to-digital converter, the first threshold detector is configured to activate the time-to-digital converter responsive to a first voltage at an input of the first threshold detector being greater than or equal to a first voltage threshold; and
a second threshold detector coupled between the first node and the fourth node, the second threshold detector is configured to generate an output voltage responsive to a second voltage at an input of the second threshold detector being greater than or equal to a second voltage threshold, the second voltage threshold being greater than the first voltage threshold.

4. The apparatus of claim 3, wherein:
the time-to-digital converter comprises a first time-to-digital converter;
the timing readout path comprises a second time-to-digital converter coupled between the second threshold detector and the fourth node; and the second threshold detector is configured to activate the second time-to-digital converter using the output voltage.

5. The apparatus of claim 3, wherein:
the timing readout path comprises a high-pass filter having an input coupled to the first node and an output coupled to an input of the first threshold detector; and
an input of the second threshold detector is coupled to either the input of the high pass filter or the output of the high-pass filter.

6. The apparatus of claim 1, wherein:
the hold circuit comprises an integrate-and-hold circuit or a peak-and-hold circuit.

7. The apparatus of claim 1, wherein:
the receive channel comprises a first receive channel;
the timing readout path comprises a first timing readout path;
the time-to-digital converter comprises a first time-to-digital converter;
the receiver comprises a second receive channel; and
the readout module comprises:
a fourth node coupled to the second receive channel;
a fifth node; and
a second timing readout path coupled between the fourth node and the fifth node, the second timing readout path comprising a second time to digital converter.

8. The apparatus of claim 7, wherein:
the intensity readout path comprises a first intensity readout path;
the analog-to-digital converter comprises a first analog-to-digital converter; and
the readout module comprises:
a sixth node; and
a second intensity readout path coupled between the fourth node and the sixth node, the second intensity readout path comprising a second analog-to-digital converter.

9. The apparatus of claim 7, wherein:
the intensity readout path comprises a first intensity readout path; and
the readout module comprises:
a selection circuit coupled to the first node, the fourth node, and the analog-to-digital converter; and
a second intensity readout path coupled between the fourth node and the third node, wherein the first intensity readout path and the second intensity readout path each include the selection circuit and the analog-to-digital converter.

10. The apparatus of claim 1, wherein the apparatus comprises a vehicle.

11. A method of a lidar system, comprising:
receiving a lidar signal that is reflected by an object;
generating, using a receive channel of the lidar system, pulse data based on the lidar signal, the pulse data comprising at least a first pulse and a second pulse;
passing the pulse data to a timing readout path of the lidar system and an intensity readout path of the lidar system;
generating, using the timing readout path, timing data that identifies a time associated with a rising edge of the first pulse within the pulse data;
outputting, using a hold circuit of the intensity readout path, an output voltage for an extended duration of the first pulse that is longer than the duration of the first pulse and does not exceed a combined duration of the first pulse and an interval between the first pulse and the second pulse to allow an analog-to-digital converter sufficient time over the extended duration to sample the output voltage, the output voltage associated with the intensity of the first pulse;
generating, using the output voltage and the intensity readout path, intensity data that indicates the intensity of the first pulse; and
detecting the object based on the timing data and the intensity data.

12. The method of claim 11, further comprising:
triggering, using a threshold detector of the timing readout path, a time-to-digital converter of the timing readout path to determine the timing data responsive to an input voltage associated with the pulse data being greater than or equal to a voltage threshold; and
sampling the output voltage using an analog-to-digital converter of the intensity readout path to generate the intensity data.

13. The method of claim 11, further comprising:
generating, using another receive channel of the lidar system, other pulse data based on the lidar signal;
pass the other pulse data to another timing readout path of the lidar system and another intensity readout path of the lidar system;
generate, using the other timing readout path, other timing data that identifies a time associated with a rising edge of another pulse within the other pulse data; and
generating, using the other intensity readout path, other intensity data that indicates another amount of energy associated with the other pulse within the other pulse data, wherein:
detecting the object based on the timing data, the other timing data, the intensity data and the other intensity data.

14. The method of claim 13, further comprising:
selectively passing the pulse data and the other pulse data to an analog-to-digital converter that is included within both the intensity readout path and the other intensity readout path; and
interleaving the intensity data and the other intensity data together based on the passing of the pulse data and the other pulse data.

15. A lidar system, comprising:
reception means for generating pulse data based on a lidar signal that is reflected by an object, the pulse data comprising multiple pulses;
threshold-triggered means for generating timing data based on the pulse data, the timing data identifying times associated with rising edges of pulses within the pulse data; and
hold-and-sample means for generating intensity data by maintaining, for an extended duration of a pulse of the multiple pulses that is longer than the duration of the pulse does not exceed a combined duration of the pulse and an interval between the pulse and a next pulse to allow an analog-to-digital converter sufficient time over the extended duration to sample an output voltage that represents an amplitude of the pulse, the intensity data indicating an intensity associated with the pulse, both the threshold-triggered means and the hold-and-sample means coupled to the reception means.

16. The lidar system of claim 15, wherein:
the threshold-triggered means comprises:
threshold means for generating triggers responsive to determining amplitudes associated with the rising edges of the pulses are greater than or equal to a threshold; and time-to-digital conversion means for determining the times associated with the triggers; and the hold-and-sample means comprises:
analog-to-digital conversion means for sampling the output voltage.

17. The lidar system of claim 15, further comprising:
other reception means for generating other pulse data based on the lidar signal;
other threshold-triggered means for generating other timing data based on the other pulse data; and
other hold-and-sample means for maintaining for an extended duration of pulses of the other pulse data, output voltages that represent amplitudes of the pulses to generate other intensity data based on samples of the other pulses, both the other threshold-triggered means and the other hold-and-sample means coupled to the other reception means.

18. The lidar system of claim 17, wherein the hold-and-sample means and the other hold-and-sample means jointly comprise multiplexing means for generating a multiplexed version of the intensity data and the other intensity data.

19. The lidar system of claim 17, wherein:
the hold-and-sample means comprises first analog-to-digital conversion means for generating the intensity data; and
the other hold-and-sample means comprises second analog-to-digital conversion means for generating the other intensity data.

20. The apparatus of claim 2, wherein the processor if further configured to:
provide a control signal to the readout module that controls the extended duration of the output voltage of the hold circuit.

* * * * *